Oct. 17, 1944.  N. HERRICK  2,360,341
SHOVEL EQUIPMENT FOR TRUCKS
Filed Oct. 22, 1943  5 Sheets-Sheet 1

Inventor
NELSON HERRICK
By Clarence A. O'Brien
and Harvey B. Jacobson
Attorneys

Oct. 17, 1944.                N. HERRICK                    2,360,341
                        SHOVEL EQUIPMENT FOR TRUCKS
                            Filed Oct. 22, 1943              5 Sheets-Sheet 3
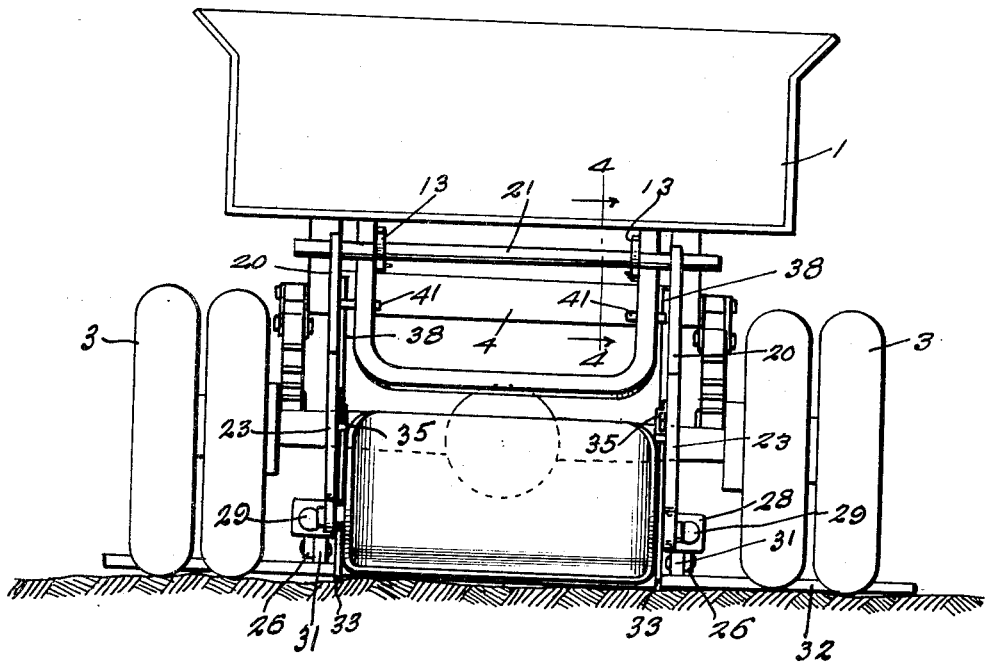
Fig. 3
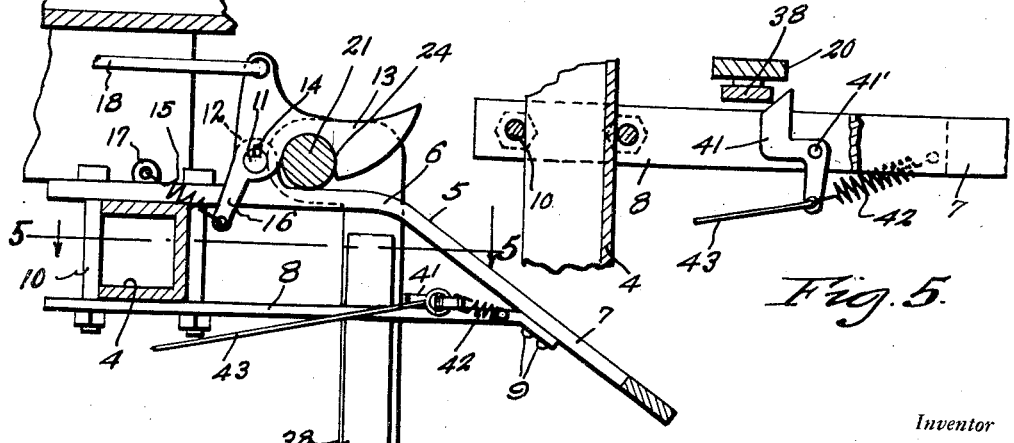
Fig. 4.    Fig. 5.
Inventor
NELSON HERRICK
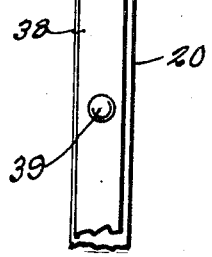
By Clarence A. O'Brien
and Harvey B. Jacobson
Attorneys

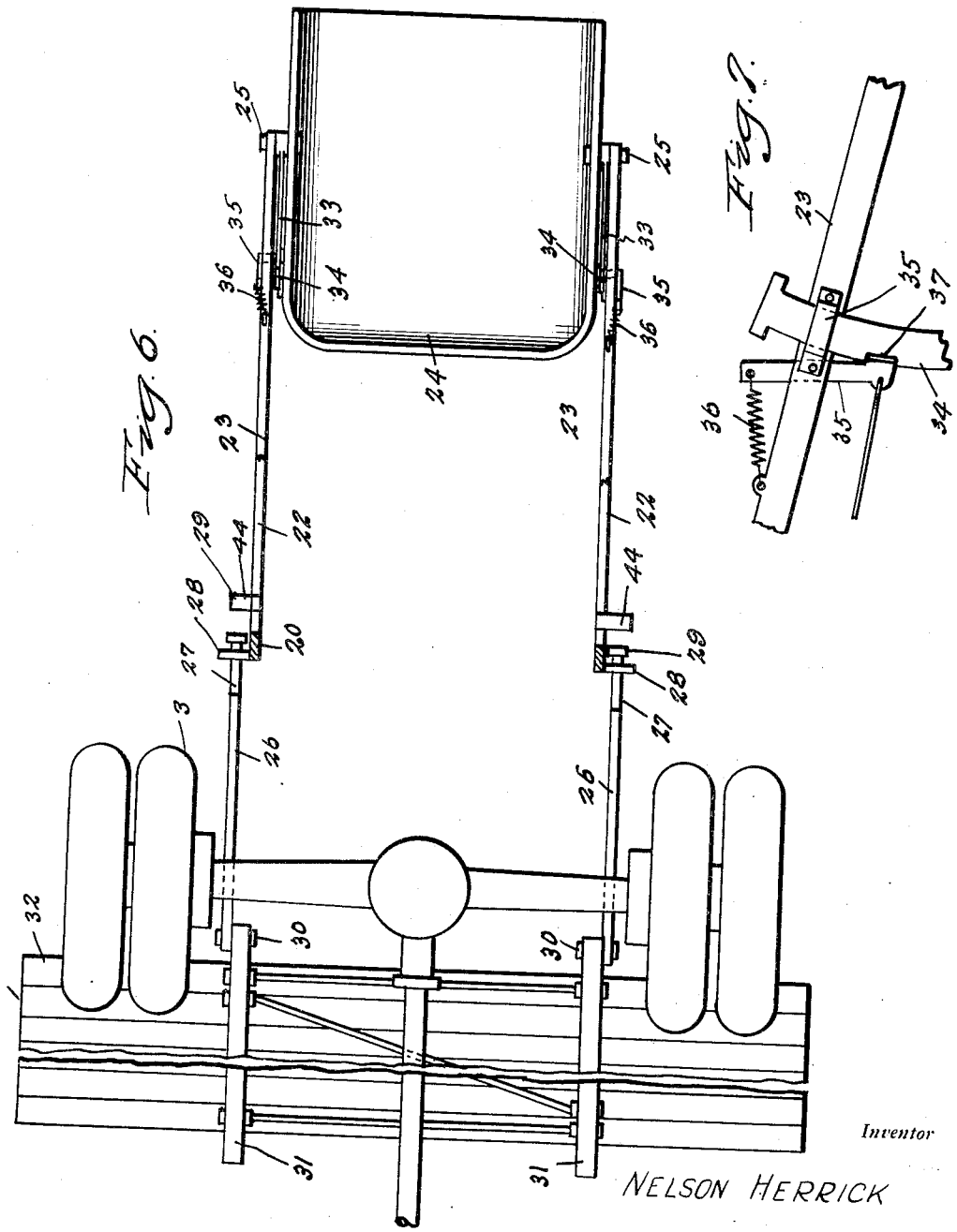

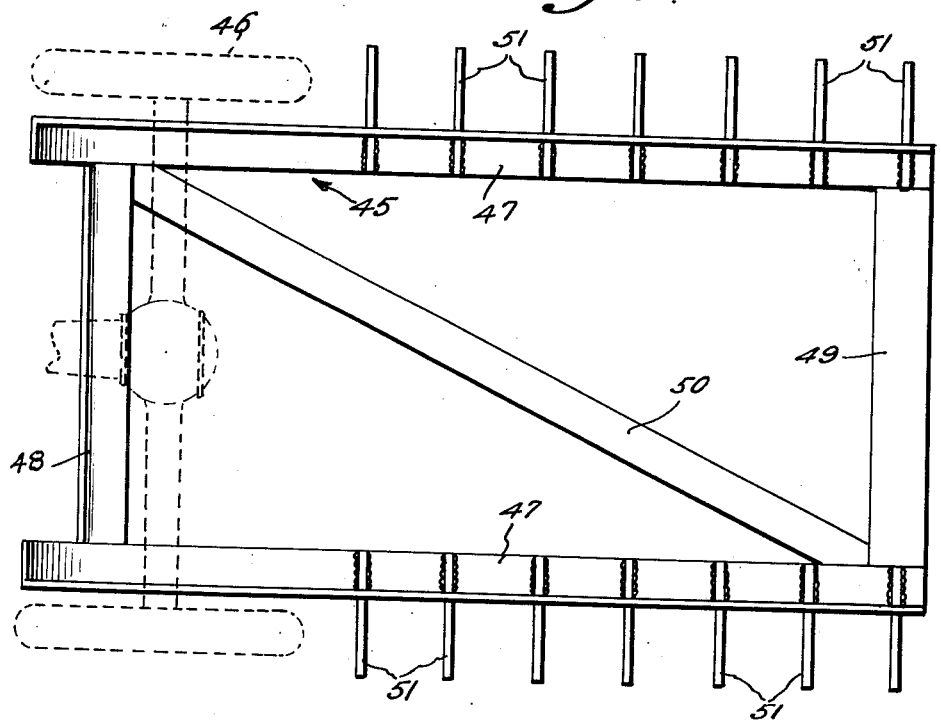
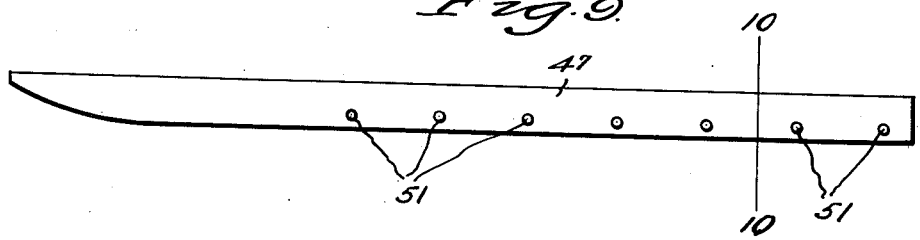
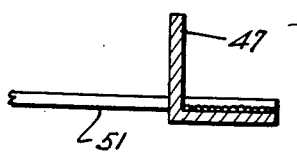

Patented Oct. 17, 1944

2,360,341

UNITED STATES PATENT OFFICE 2,360,341

SHOVEL EQUIPMENT FOR TRUCKS

Nelson Herrick, Hartford, Conn., assignor to Jerome E. Respess and Albert A. La Pointe, both of West Hartford, Conn.

Application October 22, 1943, Serial No. 507,319

3 Claims. (Cl. 214—81)

My invention relates to improvements in shovel equipment for trucks, the principal object in view being to provide efficient, simply constructed equipment of the type specified adapted for quick and easy attachment to the rear end of a truck for backing by the truck to pick up a load and operation by forward movement of the truck to elevate the load over the rear end of the truck body for dumping into said body.

Other and subordinate objects are also comprehended by my invention, all of which, together with the precise nature of my improvements, will be readily understood when the succeeding description and claims are read with reference to the drawings accompanying and forming part of this specification.

Figure 1:
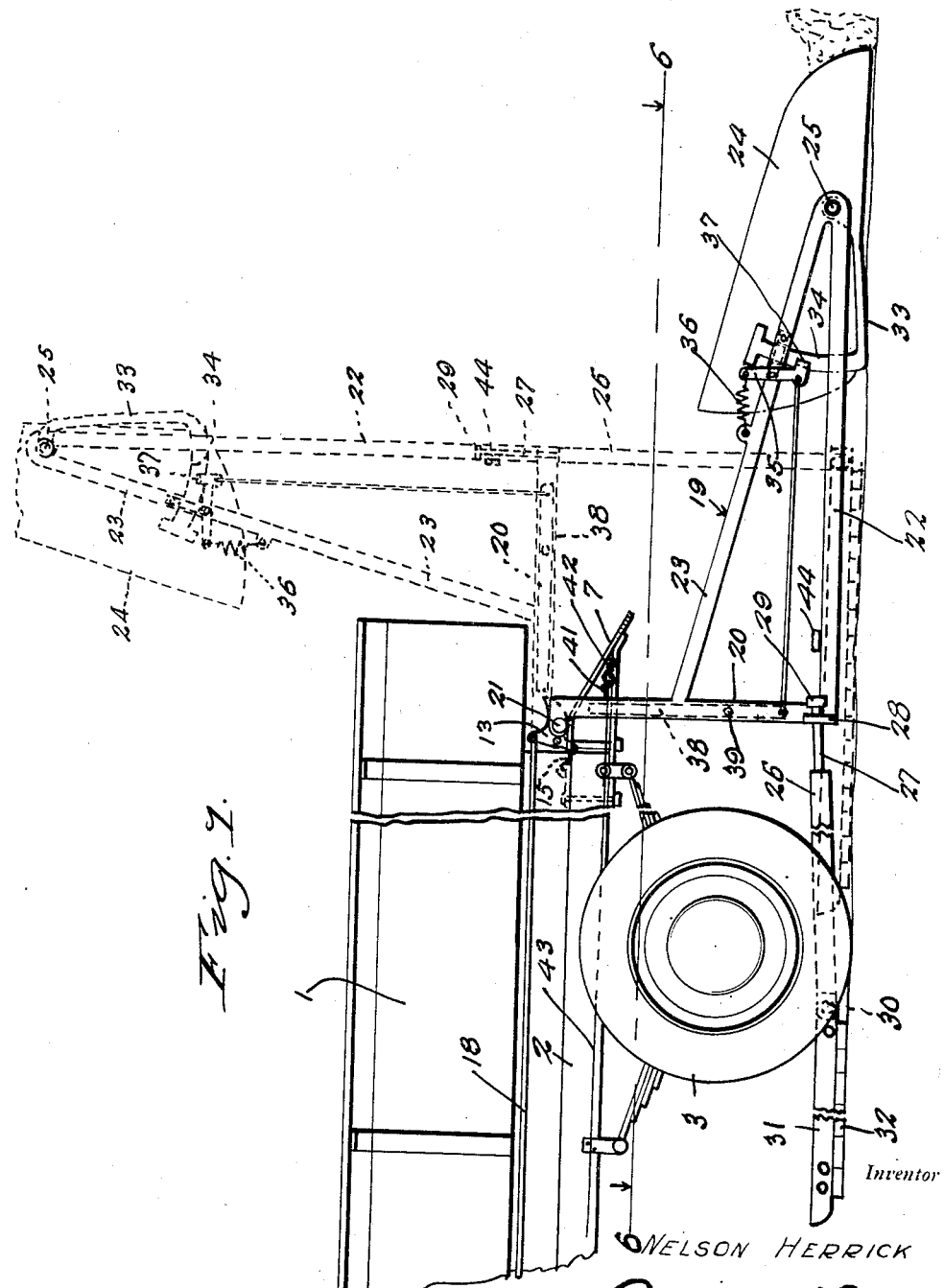
Figure 2:
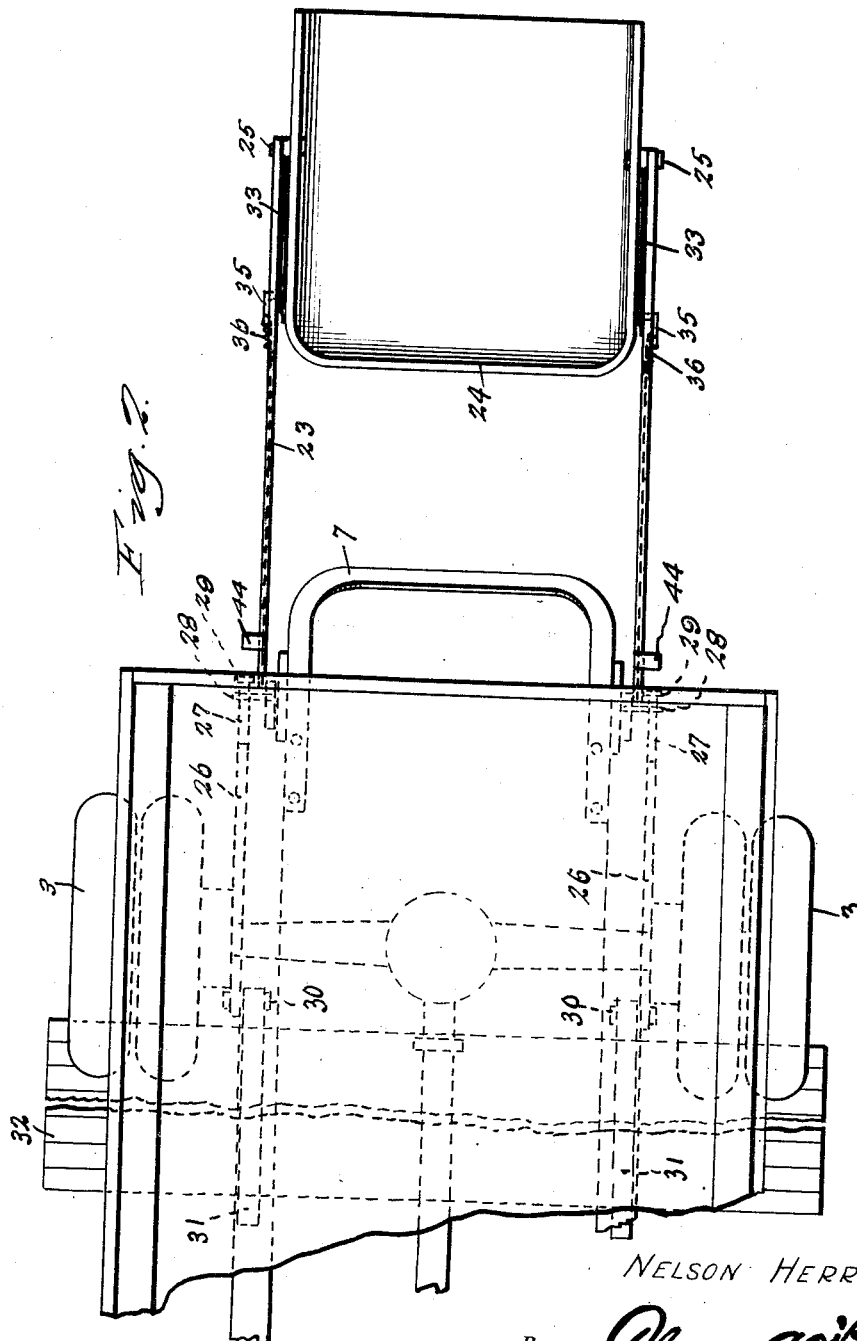

In said drawings:

Figure 1 is a view in side elevation of my improved shovel equipment in its preferred embodiment, applied to a truck, Figure 2 is a view in top plan, Figure 3 is a view in rear end elevation, Figure 4 is a view in vertical section taken on the line 4—4 of Figure 3 and drawn to an enlarged scale, Figure 5 is a view in horizontal section taken on the line 5—5 of Figure 4, Figure 6 is a view in horizontal section taken on the line 6—6 of Figure 1, Figure 7 is a fragmentary view in side elevation illustrating one of the shovel latches and parts with which the latches are directly associated, Figure 8 is a view in top plan of a modified embodiment of the drag, Figure 9 is a view in side elevation of the same, and Figure 10 is a view in transverse section taken on the line 10—10 of Figure 9.

Referring to the drawings by numerals, my invention has been shown therein as comprising an attachment for a dump truck, conventionally illustrated as sufficient for the present purposes, 1 designating the body, 2 the chassis frame and 3 the rear wheels.

According to my invention, a yoke is provided on the rear end 4 of the chassis frame 2 comprising a U-shaped frame bar 5 having side legs 6 overlying said end 4 and extending rearwardly therefrom horizontally, for a suitable distance, and then downwardly at a gradual incline, as at 7, for a purpose presently seen. A pair of side brace bars 8 underlie the rear end 4 of the chassis frame 2 and extend rearwardly to the legs 6 to which said brace bars are bolted, as at 9. Bolts 10 extending through the legs 6 and brace bars 8 detachably secure the described yoke frame to said rear end 4. A rock shaft 11 extends across the legs 6 over the horizontal portions thereof, the ends of said shaft being journaled in bearing ears 12 upstanding from said legs 6. A pair of notched latch plates 13 are keyed, as at 14, on said shaft 11 adjacent the pair of legs 6, respectively, to extend rearwardly from said shaft for vertical rocking movement thereby upwardly and downwardly into and from latching position, respectively. A pair of coil springs 15 suitably connected to depending arms 16 on the latch plates 13, and to apertured ears 17 on the legs 6, yieldingly hold said plates down in latching position. A pull rod 18 suitably connected to one of said latch plates 13, above the shaft 11, provides for rocking said plate 13 upwardly to unlatching position, thereby, through the shaft 11, similarly operating the other latch plate as will be clear. The pull rod 18 is designed to extend forwardly for operation in any suitable manner from the usual truck cab (not shown). However, it has not been deemed essential to a proper understanding of the invention to illustrate operating means for said rod 18.

The parts described in the foregoing paragraph are designed to constitute permanent equipment for the truck, and the described yoke frame to be coupled to a shovel unit vertically swingable thereon to raise and lower the same and now to be described.

The shovel unit comprises a pair of skeleton shovel-carrying, side frames 19, each including a hanger bar 20 adapted to depend, in the lowered position of the shovel unit, from a cross-shaft 21, a bar 22 extending rearwardly from the lower end of the hanger bar 20 at a right angle thereto, and a strut bar 23 inclining from the hanger bar 20 downwardly and rearwardly to the rear end of said bar 22 and joined thereto. The cross-shaft 21 is adapted to rest on the horizontal leg portions of the legs 6 of the frame bar 5, crosswise of said legs to be rotated thereon in the notches 24 of the latch plates 13, and connects the upper ends of the hanger bars 20 together so that said bars straddle the frame bar 5 and depend upon opposite sides thereof for swinging movement of said frames 19 upwardly and forwardly, and vice versa. Intermediate the side frames 19 is a flat-bottomed, rearwardly opening, scoop-like shovel 24 having its sides pivoted, as at 25, intermediate the ends of the shovel, to said frames 19 at the junctures of the bars 22, 23, whereby said shovel is adapted for vertical rocking movement on said frames about a substantially horizontal axis parallel with that of the shaft 21.

Means are provided for swinging the shovel-carrying side frames 19 upwardly, under forward movement of the truck, comprising the following devices: A pair of pusher bars 26 are connected to the lower ends of the hanger bars 20 to extend forwardly therefrom, when the shovel unit is lowered, between the rear wheels 3 of said truck. For connecting said bars 26 to the hanger bars 20, headed, rod-like, rear end extensions 27 are provided on said pusher bars 26 and which slidably extend through lateral ears 28 on the lower ends of the hanger bars 20 and provide for limited forward and rearward sliding of the bars 26 on the side frames 19 for a purpose presently seen, the limit of rearward movement being established by engagement of the rear ends of the bars 26 with said ears 28, and the limit of forward movement being established by engagement of the heads 29 of the extensions 27 with said ears 28. The pusher bars 26 are pivotally connected, as at 30, at front ends thereof, to the rear ends of a pair of side cleats 31 overlying a platform-like drag 32 sufficiently wide for surmounting by the rear wheels 3 of the truck. As best shown in Figure 1, when the side frames 19 of the shovel-carrying unit are fully lowered, and the pusher bars 26 in the forward limit of sliding movement thereof, the drag 32 lies on the ground immediately in front of the rear wheels 3 of the truck.

Returning now to the shovel 24, a pair of L-shaped runners 33 are suitably fixed to opposite sides of said shovel to extend from the pivots 25 thereof rearwardly alongside the shovel and which comprise rear, arcuate, upstanding guide arms 34 slidable in guides 35 provided on the bars 23. The runners 33 are designed to rest upon the ground and support the shovel 24 in a slightly rearwardly and downwardly tilted position so that the rear digging edge of said shovel will dig under a pile of dirt or like material. A pair of swingable, L-shaped, latches 35 are pivoted on the bars 23 and tensioned by suitably arranged coil springs 36 to engage notches 37 in the guide arms 34 so that the shovel 24 may be latched in the described digging tilting position. The latches 35 are swingable to unlatching position in opposition to the springs 36 to allow the shovel to ride on the ground unlatched so that when backed its leading digging edge will bite deeper into the ground and thereby tilt the shovel to dig deeper than when latched against tilting.

Means are provided for unlatching the shovel 24 when the shovel unit is swung downwardly. To this end a pair of latch-releasing levers 38 are pivoted intermediate the ends thereof, as at 39, on the inner sides of the hanger bars 20. Rods 40 connect the levers 38, at lower ends thereof, to the latches 35 so that if the levers 38 are swung clockwise, as viewed in Figure 1, said rods will pull the latches 35 into unlatching position. A pair of dogs 41 are pivoted, as at 41', on the bars 7 to be swung into intercepting relation to the upper ends of the levers 38 when said levers are swung down by the hanger bars 20 in lowering the shovel unit, so that said levers 38 are swung clockwise in the final stage of lowering of the shovel unit to unlatch the latches 35 in a manner which will be clear. A pair of suitably arranged coil springs 42 normally hold the dogs 41 in ineffective position. Pull rods 43 are provided for swinging said dogs 41 into intercepting relation to the levers 38, at will, and are designed to be extended to the cab, not shown, of the truck for operation by the driver through any suitable means.

Suitable stop lugs 44 are provided on the bars 22 for engagement by the extensions 27 so that when the shovel unit is swung upwardly and the front driven forwardly, the extensions 27 and pusher rods 26 are prevented from swinging rearwardly relative to the frames 23, all for a purpose presently apparent.

The modified embodiment of drag shown in Figures 8, 9 and 10 comprises a frame 45 narrower than the distance between the rear wheels 46 of the truck and including angle iron side bars 47, a similar front bar 48 and a rear bar 49. A diagonal brace bar 50 extends between diagonally opposite corners of said frame 45. Rods 51 extend outwardly from the side bars 47 for supporting the rear wheels 46.

Describing now the use and operation of my invention, with the described shovel unit disposed on the ground, the truck is backed over the drag 32 so that the bar 5 is moved in between the hanger bars 20 to pick up the shaft 21 and force the same beneath the latch plates 13. The shovel unit is now coupled to the truck and under slight further backing of the truck the extensions 27 slide forwardly in the ears 28 so that the rear wheels 3 run off the drag 32 and said drag is positioned immediately in front of said wheels. The shovel 24 is held latched by the springs 36 and latches 35. The truck may now be backed to shove the shovel into material to be picked up and loaded until said shovel is sufficiently full. To dump the shovel 24 into the truck body, said truck is driven forwardly, slightly, onto the drag 32, the extensions 27 of the pusher bars 26, in this operation, sliding rearwardly and idly in the ears 28. The truck is then driven forwardly on the drag 32 which is thereby held stationary so that when the pusher bars 26 abut the ears 28, the shovel unit is caused to swing upwardly and forwardly to swing the shovel 24 up over the rear end of the truck body 1 for dumping by gravity into said body. At this point, it should be explained that the drag 32 is proportioned so that as soon as the shovel unit is swung upwardly into dumping position, shown substantially in dotted lines in Figure 1, the rear wheels 3 ride forwardly off of said drag 32 which by engagement of its front edge with the rear of the wheels 3 maintains the several units in upswung position. Thus, the truck may be driven forwardly and with said unit upswung for a desired distance. To lower the shovel unit, it is merely necessary to back the rear wheels 3 of the truck over the drag 32 so that said unit may fall into lowered position or be pulled down by the bars 26, as the case may be. During lowering of the shovel unit, the dogs 41 may be operated, in the manner already described, to cause unlatching of the shovel 24, if desired, depending upon how deep it is desired to dig with said shovel.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. The combination with a truck including a body, and rear wheels, of a shovel, means to mount said shovel on said truck in the rear of said body including an upwardly and forwardly swingable frame, and ground engaging means to swing said frame rendered effective by passage of the rear wheels thereover and forward travel of the truck comprising a platform drag, pusher arms pivoted on said drag, and lost motion sliding connections between said arms and frame providing for passage of said wheels off said drag when said frame is swung into substantially vertical position.

2. The combination with a truck including rear wheels, of a shovel adapted to be backed along the ground, a shovel carrying frame, and coacting devices on the rear end of said truck and said frame for coupling the truck to the frame under backing of the truck and pivotally mounting the frame on the truck when coupled for upward and forward swinging of the frame, said devices comprising a yoke frame on said truck, vertically swingable latches on said yoke frame, and a shaft on said shovel carrying frame over which said latches are adapted to be pushed to engage therewith with a snap action.

3. The combination with a truck including rear wheels, of a frame mounted on said truck for swinging upwardly and downwardly, a shovel pivoted in said frame, ground engaging means for swinging said frame upwardly and downwardly rendered effective by passage of said wheels thereover in opposite directions and comprising a drag, releasable latch means for preventing pivotal movement of the shovel in said frame during upward swinging of the frame, and means to release said latch means operative by downward swinging of said frame.

NELSON HERRICK.